United States Patent
Nance et al.

(10) Patent No.: US 10,335,729 B1
(45) Date of Patent: Jul. 2, 2019

(54) STRUCTURAL SUPPORT FOR AIR FILTER

(71) Applicant: American Air Filter Company, Inc., Louisville, KY (US)

(72) Inventors: Nathaniel Nance, LaGrange, KY (US); Donnie Baldwin, Taylorsville, KY (US)

(73) Assignee: AMERICAN AIR FILTER COMPANY, INC., Louisville, KY (US)

( * ) Notice: Subject to any disclaimer, the term of this patent is extended or adjusted under 35 U.S.C. 154(b) by 414 days.

(21) Appl. No.: 15/282,493

(22) Filed: Sep. 30, 2016

(51) Int. Cl.
  *B01D 46/52* (2006.01)
  *B01D 46/00* (2006.01)

(52) U.S. Cl.
  CPC ....... *B01D 46/522* (2013.01); *B01D 46/0005* (2013.01); *B01D 46/521* (2013.01); *B01D 46/523* (2013.01); *B01D 2265/04* (2013.01); *B01D 2275/10* (2013.01)

(58) Field of Classification Search
  CPC .............. B01D 46/0005; B01D 46/521; B01D 46/522; B01D 46/523; B01D 2265/04; B01D 2275/10
  See application file for complete search history.

(56) References Cited

U.S. PATENT DOCUMENTS

| | | | | |
|---|---|---|---|---|
| 2,663,660 A * | 12/1953 | Layte | ................... | B01D 46/521 156/201 |
| 2,907,407 A | 10/1959 | Engle et al. | | |
| 4,055,857 A * | 11/1977 | Brucciani | .............. | A42B 1/043 2/200.3 |
| 4,440,304 A * | 4/1984 | Konopko | ............ | B65D 81/056 206/586 |
| 4,530,353 A * | 7/1985 | Lauritzen | ............ | A61F 13/0276 602/42 |
| 5,161,692 A * | 11/1992 | Knierim | ................... | B65D 5/32 206/320 |
| 6,074,450 A | 6/2000 | Raber | | |
| 6,099,609 A | 8/2000 | Lira et al. | | |
| 6,264,727 B1 | 7/2001 | Elmore | | |
| 6,347,700 B1 * | 2/2002 | Redfield | ................. | F42B 39/00 206/3 |
| 7,537,632 B2 | 5/2009 | Miller et al. | | |
| 7,883,572 B2 | 2/2011 | Neudeck | | |
| 8,545,589 B2 | 10/2013 | Rocklitz et al. | | |
| 8,709,139 B2 | 4/2014 | Veeser et al. | | |

(Continued)

FOREIGN PATENT DOCUMENTS

| | | |
|---|---|---|
| EP | 2357032 | 8/2011 |
| JP | 07265632 | 10/1995 |
| WO | 2004090589 | 10/2004 |

OTHER PUBLICATIONS

Global Industrial. Purolator Air Filters. Retrieved on Apr. 27, 2016: http://www.globalindustrial.com/c/hvac/filters/air-filters-purolator Apr. 27, 2016.

(Continued)

*Primary Examiner* — Jason M Greene
(74) *Attorney, Agent, or Firm* — Middleton Reutlinger

(57) ABSTRACT

The present disclosure is directed to inventive methods, apparatus, and systems for supporting pleated filter media. Flaps of a support strip may be folded in an overlapping engagement to support the filter media in a variety of applications.

20 Claims, 6 Drawing Sheets

(56) References Cited

U.S. PATENT DOCUMENTS

| | | | |
|---|---|---|---|
| 2005/0150201 A1* | 7/2005 | Choi | B01D 46/523 55/499 |
| 2006/0053759 A1* | 3/2006 | Winters | B01D 46/523 55/497 |
| 2008/0105123 A1 | 5/2008 | Devine | |
| 2010/0251679 A1 | 10/2010 | Kawano et al. | |
| 2012/0167535 A1* | 7/2012 | Underwood | B01D 46/523 55/497 |
| 2012/0272829 A1 | 11/2012 | Fox et al. | |
| 2014/0165839 A1 | 6/2014 | Crabtree | |
| 2015/0375143 A1 | 12/2015 | Kathan et al. | |
| 2016/0067647 A1 | 3/2016 | Tate et al. | |

OTHER PUBLICATIONS

G3 Technologies. AmAir-Carbon Panel Filters and Pleats. Retrieved on Apr. 27, 2016: http://www.g3filters.com/carbon_filters.php Apr. 27, 2016.

www.allergyclean.com. HVAC Furnace and Air Conditioning Air Filters. Retrieved on Apr. 27, 2016: http://www.allergyclean.com/allergy-proofing-products/hvac-furnace-and-air-conditioning-air-filters/ Apr. 27, 2016.

\* cited by examiner

STRUCTURAL SUPPORT FOR AIR FILTER

TECHNICAL FIELD

The present embodiments are directed generally to supporting an air filter. More particularly, various inventive methods, apparatus, and systems disclosed herein relate to one or more folded support strips to reinforce the filter media of an air filter.

BACKGROUND

Typical support structure may be inserted within the pleats of a pleated filter media. However, there may be several disadvantages associated with the support structure being inserted within a plurality of pleats. Support structure that is inserted between pleats have to be sized to fit within each pleat valley of the particular application. Because pleat size and shape may vary between applications, setting up different manufacturing processes and tooling for different products may be laborious and costly. For example, the ends of the typical support structure may have to be different than the remaining portion of the support structure inserted within the pleats. As such the different ends must be manufactured at a specific position relative to the remaining portion and sized to fit each frame opening defined by the filter frame for each application. As such consistent insertion, alignment, attachment between multiple pleats of filter media and/or frame may be difficult.

Thus, there is a need in the art to reduce these process issues with an improved filter media support.

SUMMARY

The present disclosure is directed to inventive methods, apparatus, and systems for supporting filter media. For example in various embodiments, flaps of a support strip may be folded in an overlapping engagement to support the filter media of a filter apparatus in a variety of applications.

Generally, in one aspect, an embodiment of the filter apparatus may include a filter media that has a plurality of pleats. The plurality of pleats may have a plurality of pleat tips each defined by a pair of sloping side surfaces along a front face and a rear face of the filter media. The filter apparatus may have an outer peripheral frame receiving the filter media. Further, the apparatus may have one or more elongated first support strips on the front face of the filter media and transversely orientated to the plurality of pleats. The apparatus may include one or more elongated second support strips on the rear face of the filter media and transversely orientated to the plurality of pleats. Moreover, at least one of the second support strips may have an elongated center flap and opposing first and second folding lateral flaps. The first folding lateral flap may extend from the center flap along a first folding edge and the second folding lateral flap may extend from the center flap along a second folding edge. Further, at least a portion of each one of the first folding lateral flap, the second folding lateral flap, and the center flap may be substantially planar when in an overlapping engagement with each other. Further, at least one of the first support strips on the front face may at least partially overlap at least one of the second support strips on the rear face.

In various embodiments, the one or more elongated second support strips may span adjacent pleat tips along the rear face. In some embodiments, the first folding lateral flap, the second folding lateral flap, and the center flap may be laminated together when in the overlapping engagement. Moreover, in some embodiments, the one or more opposing ends of at least one of the one or more second support strips may be positioned between the filter media and at least a portion of the outer peripheral frame. In some embodiments, the overlapping engagement may be secured by at least one of adhesive, heat bonding, or ultrasonic welding. In various embodiments, one or more elongated second support strips may be formed of a blank of board stock. In some embodiments, the first folding lateral flap may extend from the first folding edge to adjacent the second folding edge when in the overlapping engagement. Further, the second folding lateral flap extends from the second folding edge to adjacent the first folding edge when in the overlapping engagement. In various embodiments, the first folding lateral flap and the second folding lateral flap may overlap the same side of the center flap when in the overlapping engagement. In some embodiments, the one or more elongated first support strips may be an elongated single-ply support strip.

Generally, in another aspect, an embodiment of the filter apparatus may include a filter media that may have a plurality of pleats. The plurality of pleats may include a plurality of pleat tips each defined by a pair of sloping side surfaces along a front face and a rear face of the filter media. The apparatus may include an outer peripheral frame receiving the filter media. Further, the apparatus may include one or more elongated support strips on the rear face of the filter media and transversely orientated to the plurality of pleats. Further, at least one of the support strips may include an elongated center flap and opposing first and second folding lateral flaps. The first folding lateral flap may extend from the center flap along a first folding edge and the second folding lateral flap may extend from the center flap along a second folding edge. At least a portion of each one of the first folding lateral flap, the second folding lateral flap, and the center flap may be substantially planar when in an overlapping engagement with each other. Further, the first folding lateral flap, the second folding lateral flap, and the center flap may be secured together when in the overlapping engagement.

In various embodiments, the filter apparatus may include one or more elongated single-ply support strips on the front face of the filter media and transversely orientated to the plurality of pleats. Further, at least one of the single-ply support strips on the front face at least partially overlaps at least one of the one or more support strips on the rear face. In some embodiments, the one or more elongated support strips span adjacent the pleat tips along the rear face. In addition, in some embodiments, one or more opposing ends of at least one of the one or more support strips may be positioned between the filter media and at least a portion of the outer peripheral frame. In various embodiments, the overlapping engagement may be secured by at least one of adhesive, heat bonding, or ultrasonic welding. In some embodiments, one or more elongated support strips may be formed of a blank of board stock.

Generally, in another aspect, one embodiment of an elongated support strip in combination with a pleated filter media may include one or more elongated support strips formed of a blank of board stock. The one or more support strips may be positioned on a rear face of a pleated filter media and transversely orientated to a plurality of pleats. At least one of the support strips may include an elongated center flap and opposing first and second folding lateral flaps. The first folding lateral flap may extend from the center flap along a first folding edge and the second folding lateral flap may extend from the center flap along a second folding edge. Further in some embodiments, at least a portion of each one of the first folding lateral flap, the second folding lateral flap, and the center flap may be substantially planar when in an overlapping engagement with each other. In some embodiments, the first folding lateral flap, the second folding lateral flap, and the center flap may be secured together by at least one of adhesive, heat bonding, or ultrasonic welding when in the overlapping engagement.

Further in various embodiments, an outer peripheral frame may receive the filter media. In some embodiments, the first folding lateral flap may extend from the first folding edge to adjacent the second folding edge when in the overlapping engagement. Moreover in some embodiments, the second folding lateral flap may extend from the second folding edge to adjacent the first folding edge when in the overlapping engagement. In various embodiments, the first folding lateral flap and the second folding lateral flap may overlap the same side of the center flap when in the overlapping engagement.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

More generally, Applicants have recognized and appreciated that it would be beneficial to support the filter media with one or more elongated support strips that are folded upon itself to strengthen the filter media when used when filtering the fluid stream. Moreover, it may be beneficial to reduce the amount of support structure inserted within adjacent pleats while providing the same or additional support.

Referring to the figures, in one embodiment, one or more elongated support strips 20 may be used within an air filter apparatus 30 to support the pleated filter media 40 in a variety of applications.

Figure 3:
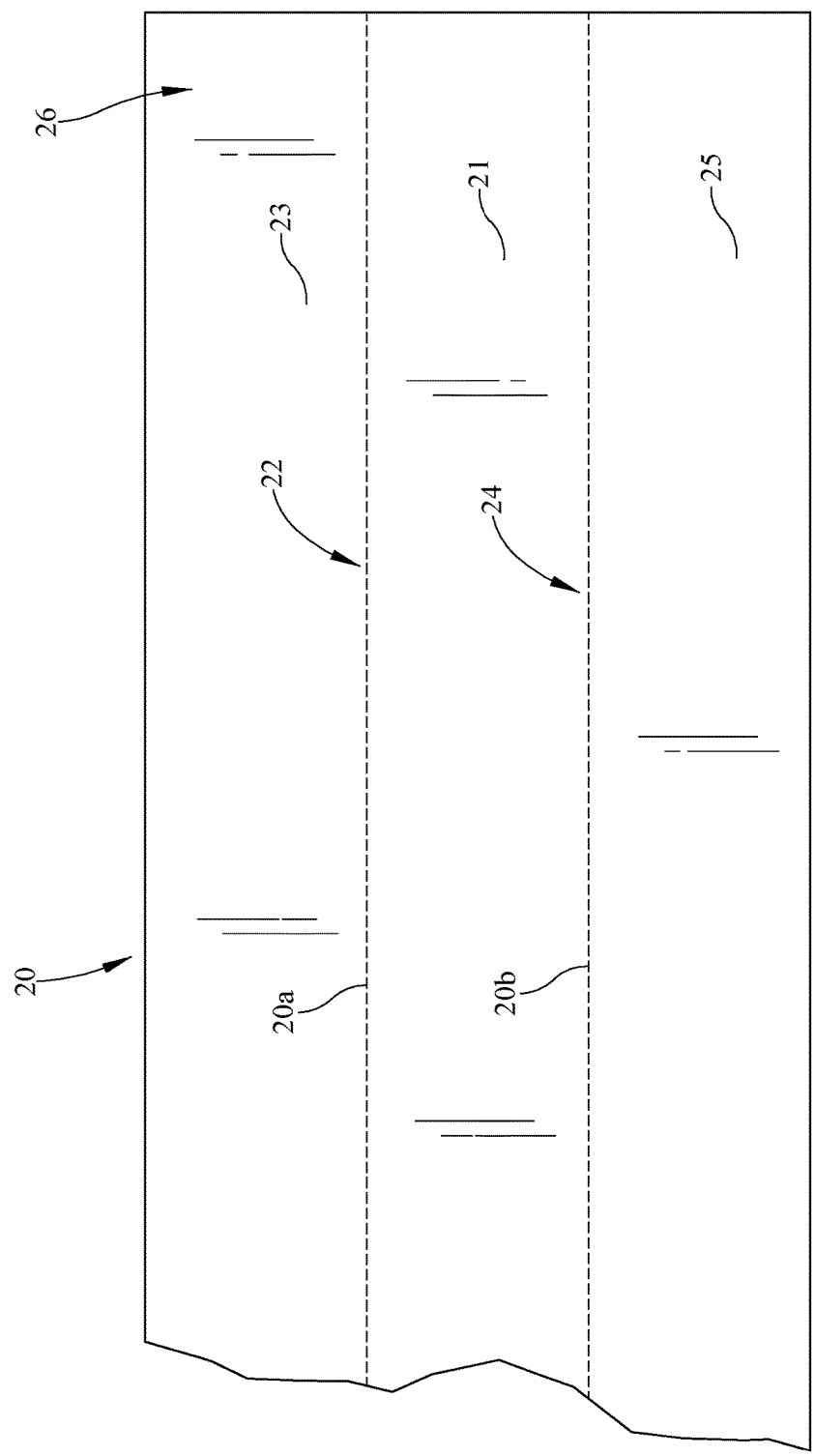
FIG. 3 illustrates a portion of a flat blank which can be folded into an overlapping configuration and provide the elongated support members or strips.

As shown in FIG. 3, a portion of the support strip 20 is disclosed in blank form with fold lines indicated by lines 20a, 20b. The support strip 20 may be formed of blank of board stock in some embodiments. Board stock may be a variety of materials such as but not limited to beverage board, poly-coated board, plastic board stock, or the like. However, the support strip 20 may be constructed of any material to provide the desired support characteristics of an intended application such as but not limited to paper, plastic, or metal. An elongated center flap 21 may be positioned between a first folding lateral flap 23 and an opposing second folding lateral flap 25. The first lateral folding flap 23 may extend from the center flap 21 along a first folding edge 22 along line 20a. The second folding lateral flap 25 may extending from a second folding edge 24 opposite to the first folding edge 22. In one embodiment, the first and second folding edges 22 and 24 are substantially parallel to each other. To form support strips 20, the blank of the support strip 20 may be folded along the fold lines 20a and 20b to create an overlapping engagement 50 between the center flap 21, first folding lateral flap 23, and/or second folding lateral flap 25 to strengthen the support strip 20. The fold lines 20a and 20b may allow movement of the flaps relative to each other to provide the overlapping engagement 50. As shown more clearly in FIGS. 1 and 4-6, when the blank is reconfigured to the overlapping engagement 50, the support strip 20 may be substantially planar along a portion of its length.

Figure 5:
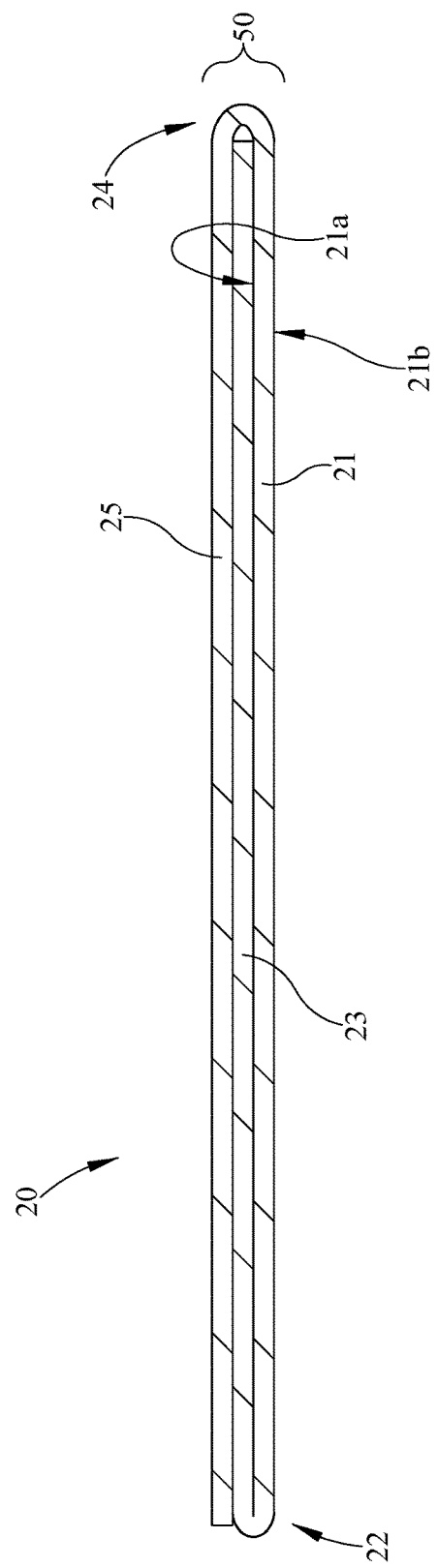
FIG. 5 illustrates a cross section along line 5-5 of FIG. 4 of one embodiment of the elongated support strip.
Figure 6:
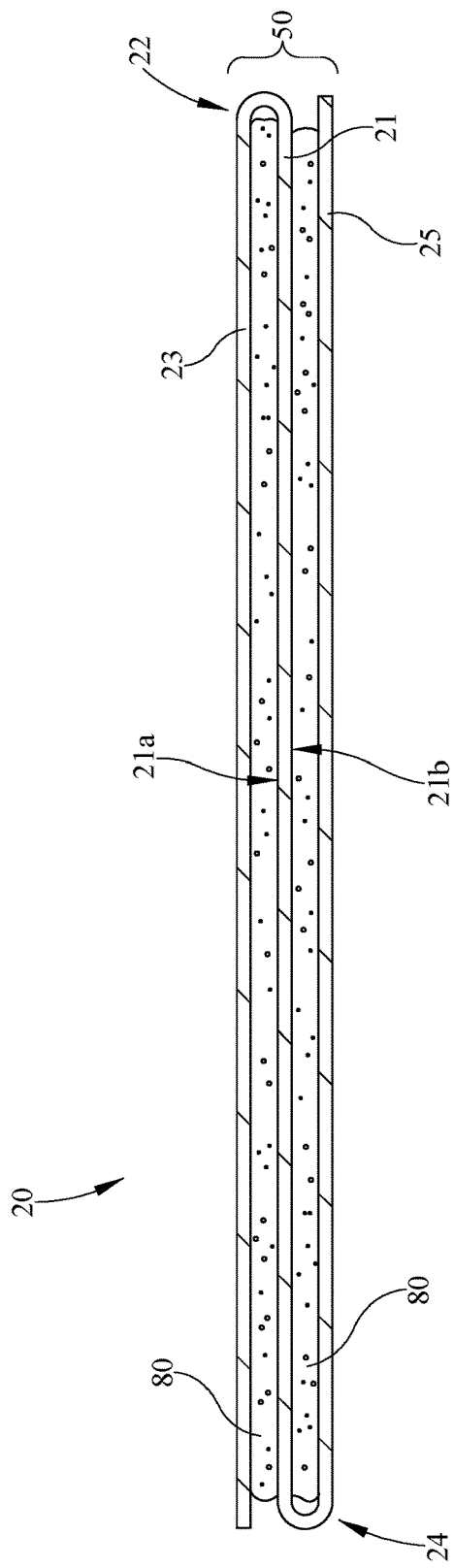
FIG. 6 illustrates a cross section along 5-5 of FIG. 4 of another embodiment of the elongated support strip.

The plurality of folding flaps 23 and 25 of the support strip 20 may overlap one or more portions of each other along a portion of the length of the center flap 21. Preferably, the strip has one or more three-layer overlapping flaps. As shown in one embodiment of FIG. 5, the first folding lateral flap 23 and second folding lateral flap 25 are positioned or overlap on the same side of the center flap 21, more specifically a rear face 21a of the center flap. It is understood that both overlapping lateral flaps 23 and 25 may be alternatively positioned on the opposing front face 21b of the center flap 21 and create a three-layer stack of flaps. In another embodiment as shown in FIG. 6, each lateral folding flap 23 and 25 is positioned in overlapping engagement 50 on opposing sides of the center flap 21. The first folding lateral flap 23 may be positioned on one side of the center flap 21, such as the rear face 21a, and the second folding lateral flap 25 may be position on the opposing other side, such as the front face 21b. Alternatively, the first and second folding lateral flap 23, 25 positions on the relative side of the center flap 21 may be switched if desired. Although it is shown that one or more flaps 23 and 25, in the overlapping engagement 50 with center flap 21, extends from their respective folding edge 22 and 24 towards and adjacent the other folding edge of the other folding flap, it should be understood that one or more of the folding flaps may extend only a portion of the center flap between the folding edges and still provide an overlapping engagement between two or more of the folding flaps and the center flap. In addition, in some embodiments, the free end of a folding flap may extend past one or more opposing folding edge of the opposing folding flap. Further, although the overlapping engagement 50 extends from a proximal end 26 to a distal end 27 of the support strip 20 in one embodiment, it should be understood that the overlapping engagement 50 may extend for one or more portions of the length of the elongated support strip.

In some embodiments, the overlapping engagement 50 between two or more flaps 23, 25 with center flap 21, or portions thereof, may be secured or connected together by a variety of mechanisms, adhesives, or methods, such as but is not limited to adhesive bonding including hot melt EVA adhesive, thermal bonding, solvent bonding, or ultrasonic bonding. One embodiment as shown in FIG. 6 uses an adhesive 80 between relative portions of one or more flaps 21, 23, and/or 25 to secure and produce a more rigid support strip 20. In some embodiments, an adhesive may not be used. Further in various embodiments such as but is not limited to FIG. 5, one or more portions of the folded support strip 20 may be laminated together in the overlapping engagement 50. The strip 20 may be laminated by heat bonding, ultrasonic welding, or the like. In some embodiments as shown in FIG. 5, the flaps may be ultrasonically welded to one or more of each other. Lamination may not be used in some embodiments as is shown in FIG. 6. Although various embodiments of securing the folded configuration is shown in the drawings, it is to be understood that other overlapping configurations and/or securing the folds are within the scope and contemplation of the embodiments of the invention. For example, it should also be understood in some embodiments that the blank, or portions thereof, may be applied with adhesive or laminated at different stages of folding into the strip configuration, such as but not limited to before, during, and/or after.

The support strip 20 may be a variety of quantities, shapes, sizes, constructions, and orientations relative to the media 40 and still be within the scope of the teachings herein. The strip blank may be about 0.028 inches thick and be board stock such as but not limited to beverage board. The configured support strip 20 may be a strip about ⅝ inches to about 1.0 inches wide and about 0.084 inches thick in one or more portions thereof. However, it will be recognized by those of skill in the art that the dimensions may be adjusted and/or varied according to the needs of a particular application, for example to provide the substantially planar support of different widths, thickness, or length. It will be further recognized that each fold of the lateral and/or center flaps do not have to be identical as shown. Further, the thickness may be adjusted according to the adhesive and/or lamination, if used. Further, the folded edges may be adjusted and/or varied according to the needs of the application as well.

In some embodiments, the folding edges 22 and/or 24 between flaps 21, 23, and 25 may be formed by one or more score lines along fold lines 20a and 20b. The score lines may be depressions or compressions of the blank, or cuts or slices in the blank that do not extend completely through the blank. However, the folding edges 22 and 24 may be formed without score lines. Also, although the folding edges 22 and 24 as shown in FIG. 6 are generally arcuate in shape, it should be understood that a variety of folds may be used and still allow for an overlapping engagement between flaps with the center flap. For example, the embodiment shown in FIG. 5 each folding edge 22 and 24 is substantially a single peak. Moreover for example, the fold lines may be but is not limited to a truncated peak or pleat. For example by folding the blank twice, i.e., at two score lines along a fold line, a substantially flat or planar tip portion may be formed in the strip's folding edge to aid in forming a truncated pleat tip if desired.

Figure 1:
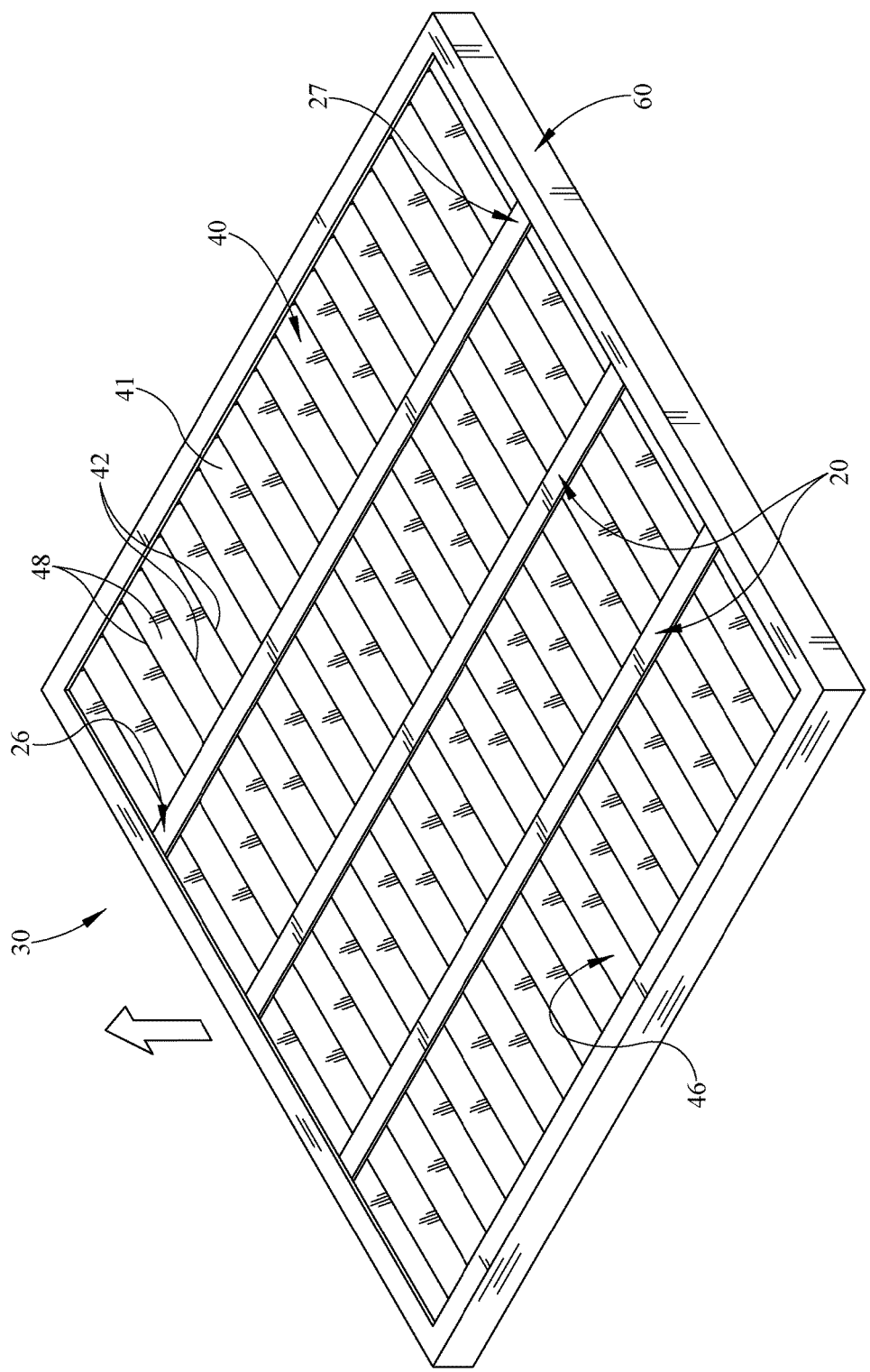
FIG. 1 illustrates a perspective view of the rear or downstream face of one embodiment of a filter apparatus which can be used with an embodiment of the elongated support members.

In various embodiments, one or more support strips 20 may be used in a filter apparatus or system. The support strips 20 may span adjacent pleat tips 42 along at least one face of the filter media 40. In one embodiment of making the self-supporting pleated filter as shown in FIG. 1 includes placing one or more of the support strips 20 orientated in the direction of pleating or transversely orientated to the plurality of pleats, along a rear face 46 of a filter media 40. In some embodiments, the support strips 20 do not substantially extend downwardly between adjacent pleat tips 42. The support strip 20 structure may add increased strength to the central or other portions of the media 40 which is otherwise typically difficult to reinforce due to the distance of the central portion from the outer peripheral supporting frame 60. Thus increased structural rigidity of the filter pack allows the filter to be maintained in service for a longer time interval, lowering the overall operational cost of the system by extending filter life. It should be understood that support strips 20 may be positioned along either the rear face 46 or front face 44, or both the front face and rear face, in a variety of orientations relative to the filter media 40. Any of the support strips herein may be used along the front face of the filter media, as a result the support strip may be positioned upstream or downstream in the air flow. In one embodiment, each support strip is connected or bonded to the filter media tips 42. Support strip 20 may be bonded to the media 40 using a variety of techniques, such as adhesive bonding including hot melt EVA adhesive, thermal bonding, solvent bonding, or ultrasonic bonding. The adhesive between support strip and media may be applied, but is not limited to, a continuous line of adhesive.

Figure 4:
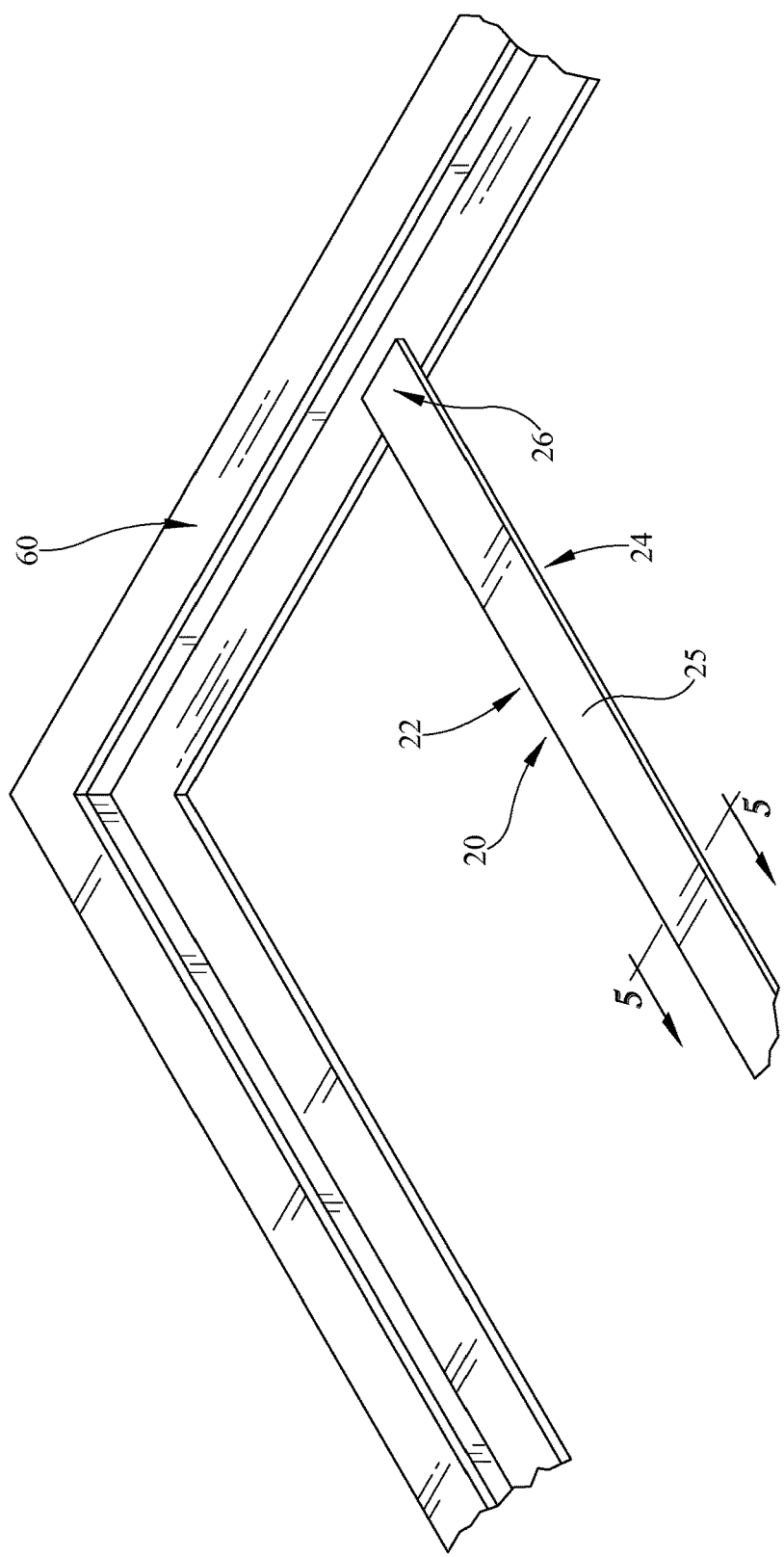
FIG. 4 illustrates perspective view of a portion of the filter frame with an embodiment of the elongated support strip folded and secured to the filter frame member.

As shown in FIGS. 1 and 4, one or more of the opposing ends 26, 27 of the support strip 20 may be secured to the filter frame 60, if used. The support strip 20 may be connected or adhered to the inside of the filter frame 60 periphery in some embodiments. With the end of the folded support strip 20 being substantially planar, the support strip may be adhered between the filter media and the filter frame thereby increasing support. The variety of techniques of bonding may be used as described above. Although one embodiment of the frame 60 configuration is shown in the drawings, it is to be understood that other configurations of the frame are within the scope and contemplation of the embodiments of the invention. For example, the frame construction may be a one piece wrapper rather than connected multiple pieces or members.

Figure 2:
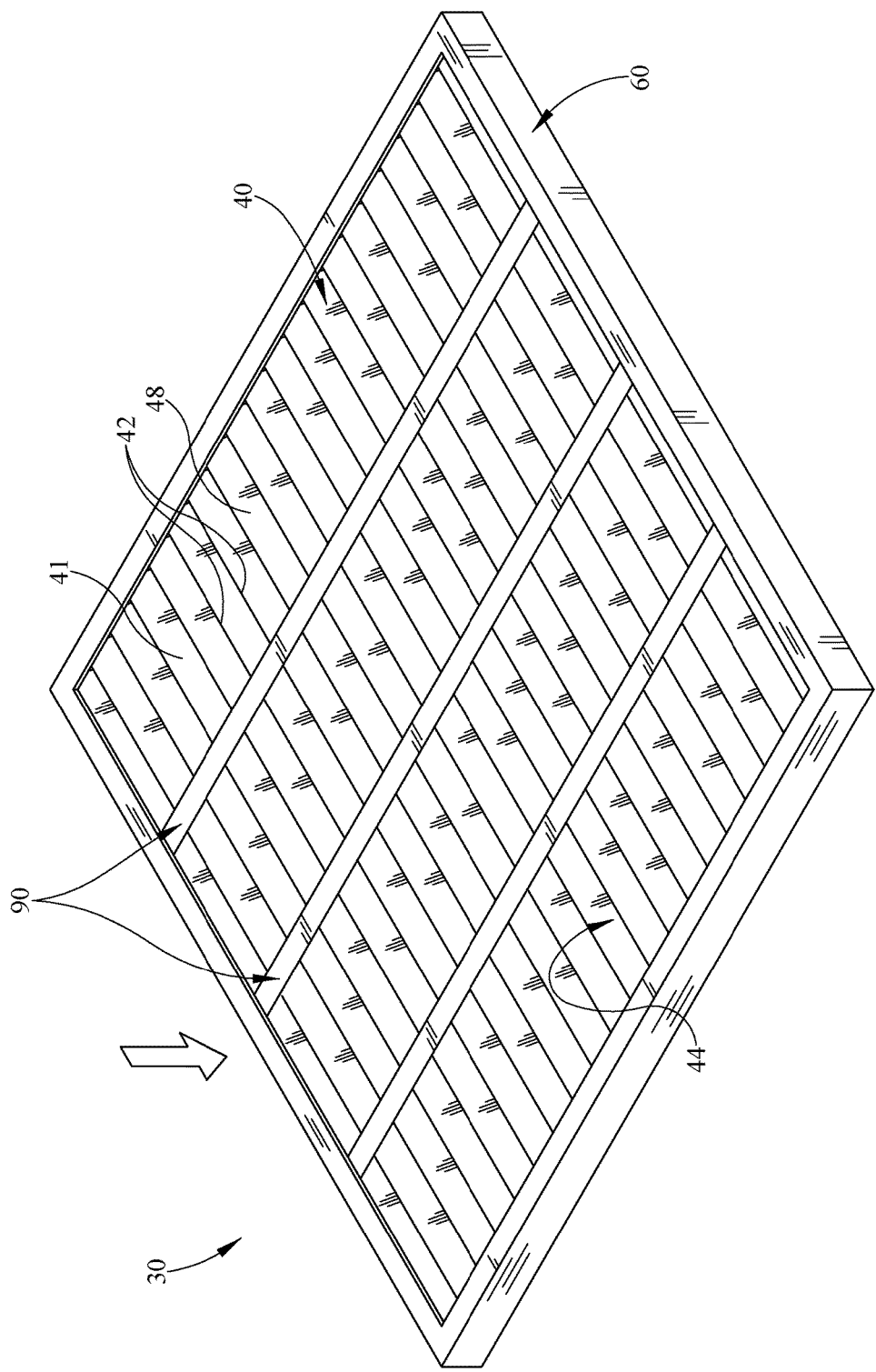
FIG. 2 illustrates a perspective view of one embodiment of the front or upstream face of the filter apparatus of FIG. 1.

In various embodiments, the support strips 20 may be used with one or more elongated single-ply support strips 90 or other reinforcing structure. The single-ply support strips 90 may be about 0.028 inches thick and may be larger or substantially the same width as each support strip 20. If used in some embodiments, one or more single-ply support strips 90 may be located on the front face 44 or opposing face over each support strip 20 on the rear face 46, as more specifically shown in the embodiment of FIG. 2. Alternatively stated, each of the single-ply strips 90 may partially overlap a support strip 20. Each single-ply support strip 90 may be oriented in the direction of pleating. Each single-ply support strip 90 may be oriented in the direction of pleating and abut the tip portions 42 of the filter media 40 along the front face 44. Preferably, the single-ply support strips 90 extend over and are connected to opposing end frame 60 sections to provide additional support, as shown in FIG. 2.

Embodiments of the air filter apparatus 30 may include a filter media 40 having a plurality of "fan-folded" or "accordion folded" pleats 41. Filter media 40 may be about 0.06 inches to about 0.1 inches thick. Each pleat is defined by a section of two-sided or planar filter media that is folded. Each fold defines a pleat tip 42 between a pair of or adjacent sloping side surfaces 48 along a front face 44 and a rear face 46. Pleat tips 42 are oriented perpendicular to the direction of pleating. The filter media 40 may be constructed of any material to provide the desired filtration characteristics of an intended application such as but not limited to paper, porous films of thermoplastic or thermoset materials, nonwoven webs of synthetic or natural fibers, scrims, woven or knitted materials, expanded materials, foams, or electret or electrostatically charged materials. The filter media 40 may also include sorbents, catalysts, and or activated carbon (granules, fibers, fabric, and molded shapes). One such construction may include a composition of one hundred percent (100%) low melt fibers. It will be recognized by those of skill in the art that various different filter media structural compositions may be successfully used in connection with the present embodiment.

One embodiment of making the air filter apparatus 30 includes placing one or more of the support strips 20 in the direction of pleating along at least the rear face 46 of the filter media 40. Pleat spacing and depth may be varied depending on the particular application. The pleated media material enters into a chamber that heat sets the pleats. The actual spacing of the pleats may be controlled by a slat type conveyor with a fin contacting the inside of each vertical pleat. This spacing is controlled while the support strips 20 and if used, the single-ply support strips 90 are applied, such as by adhesive or other methods described above, to the pleat tips 42 along the rear face 46 and also to pleat tips 42 of the filter media 40 along the front face 44 respectively. Upon combining of the filter media 40, support strip 20, and/or single-ply strip 90, the pack assembly advances into a cutoff station that finishes the pack assembly to a desired length. Subsequently, the pack assembly may be combined with the supporting frame 60 by adhesive or other various methods as described above. The pleated filter media 40 may not be received within the outer peripheral frame in some embodiments. It should be understood that the support strips 20, in some embodiments, may be applied continuously to the pleated media and/or applied individually, before or after the media is cut to length.

One sample of test data for one embodiment of the support strip 20, for example as shown in FIG. 1, resulted in bowing of less than about 1 inch for a 1 inch change in pressure. Further, the breach stress exceeded 2 inch of pressure drop. It should be understood that this one sampling of test data is for one embodiment of a filter apparatus using one embodiment of a support strip and should not be considered limiting.

Those of ordinary skill in the art will recognize that the frame members may be made out of paper, metal, or plastic as needed by the application in which the support strips 20 is to be used. The material forming the frame members may be, but is not limited to, 0.028 inch thick clay coated, beverage board stock.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2(b) of the Patent Cooperation Treaty ("PCT") do not limit the scope.

What is claimed is:

1. A filter apparatus comprising:
    a filter media having a plurality of pleats, said plurality of pleats having a plurality of pleat tips each defined by a pair of sloping side surfaces along a front face and a rear face of said filter media;
    an outer peripheral frame receiving said filter media;
    one or more elongated first support strips on said front face of said filter media and transversely orientated to said plurality of pleats;
    one or more elongated second support strips on said rear face of said filter media and transversely orientated to said plurality of pleats, at least one of said second support strips includes an elongated center flap and opposing first and second folding lateral flaps, wherein said first folding lateral flap extends from said center flap along a first folding edge and said second folding lateral flap extends from said center flap along a second folding edge, wherein at least a portion of each one of said first folding lateral flap, said second folding lateral flap, and said center flap is substantially planar when in an overlapping engagement with each other; and
    at least one of said first support strips on said front face at least partially overlaps at least one of said second support strips on said rear face.

2. The filter apparatus of claim 1 wherein said one or more elongated second support strips span adjacent said pleat tips along said rear face.

3. The filter apparatus of claim 1 wherein said first folding lateral flap, said second folding lateral flap, and said center flap are laminated together when in said overlapping engagement.

4. The filter apparatus of claim 1 wherein one or more opposing ends of at least one of said one or more second support strips are positioned between said filter media and at least a portion of said outer peripheral frame.

5. The filter apparatus of claim 1 wherein said overlapping engagement is secured by at least one of adhesive, heat bonding, or ultrasonic welding.

6. The filter apparatus of claim 1 wherein said one or more elongated second support strips are formed of a blank of board stock.

7. The filter apparatus of claim 1 wherein said first folding lateral flap extends from said first folding edge to adjacent said second folding edge when in said overlapping engagement.

8. The filter apparatus of claim 7 wherein said second folding lateral flap extends from said second folding edge to adjacent said first folding edge when in said overlapping engagement.

9. The filter apparatus of claim 1 wherein said first folding lateral flap and said second folding lateral flap overlap the same side of said center flap when in said overlapping engagement.

10. The filter apparatus of claim 1 wherein said one or more elongated first support strips is an elongated single-ply support strip.

11. A filter apparatus comprising:
    a filter media having a plurality of pleats, said plurality of pleats having a plurality of pleat tips each defined by a pair of sloping side surfaces along a front face and a rear face of said filter media;
    an outer peripheral frame receiving said filter media;
    one or more elongated support strips on said rear face of said filter media and transversely orientated to said plurality of pleats, at least one of said support strips includes an elongated center flap and opposing first and second folding lateral flaps, wherein said first folding lateral flap extends from said center flap along a first folding edge and said second folding lateral flap extends from said center flap along a second folding edge, wherein at least a portion of each one of said first folding lateral flap, said second folding lateral flap, and said center flap is substantially planar when in an overlapping engagement with each other; and
    wherein said first folding lateral flap, said second folding lateral flap, and said center flap are secured together when in said overlapping engagement.

12. The filter apparatus of claim 11 further comprising one or more elongated single-ply support strips on said front face of said filter media and transversely orientated to said plurality of pleats, and wherein at least one of said single-ply support strips on said front face at least partially overlaps at least one of said one or more support strips on said rear face.

13. The filter apparatus of claim 11 wherein said one or more elongated support strips span adjacent said pleat tips along said rear face.

14. The filter apparatus of claim 11 wherein one or more opposing ends of at least one of said one or more support strips are positioned between said filter media and at least a portion of said outer peripheral frame.

15. The filter apparatus of claim 11 wherein said overlapping engagement is secured by at least one of adhesive, heat bonding, or ultrasonic welding.

16. The filter apparatus of claim 11 wherein said one or more elongated support strips are formed of a blank of board stock.

17. An elongated support strip in combination with a pleated filter media comprising:
    one or more elongated support strips formed of a blank of board stock;
    said one or more support strips positioned on a rear face of a pleated filter media and transversely orientated to a plurality of pleats, at least one of said support strips includes an elongated center flap and opposing first and second folding lateral flaps, wherein said first folding lateral flap extends from said center flap along a first folding edge and said second folding lateral flap extends from said center flap along a second folding edge, wherein at least a portion of each one of said first folding lateral flap, said second folding lateral flap, and said center flap is substantially planar when in an overlapping engagement with each other; and wherein said first folding lateral flap, said second folding lateral flap, and said center flap are secured together by at least one of adhesive, heat bonding, or ultrasonic welding when in said overlapping engagement.

18. The elongated support strip in combination with a pleated filter media of claim 17 wherein said first folding lateral flap extends from said first folding edge to adjacent said second folding edge when in said overlapping engagement.

19. The elongated support strip in combination with a pleated filter media of claim 17 wherein said second folding lateral flap extends from said second folding edge to adjacent said first folding edge when in said overlapping engagement.

20. The elongated support strip in combination with a pleated filter media of claim 17 wherein said first folding lateral flap and said second folding lateral flap overlap the same side of said center flap when in said overlapping engagement.

\* \* \* \* \*